United States Patent [19]

Yamazaki

[11] Patent Number: 5,191,457
[45] Date of Patent: Mar. 2, 1993

[54] WDM OPTICAL COMMUNICATION WHEREIN OPTICAL BEAMS ARE MODULATED BY CHANNEL DISCRIMINATION SIGNALS OF DIFFERENT FREQUENCIES BEFORE BY DATA SIGNALS

[75] Inventor: Shuntaro Yamazaki, Tokyo, Japan
[73] Assignee: NEC Corporation, Tokyo, Japan
[21] Appl. No.: 643,259
[22] Filed: Jan. 22, 1991
[30] Foreign Application Priority Data Jan. 19, 1990 [JP] Japan .................................. 2-11475

[51] Int. Cl.$^5$ ........................................... H04J 14/02
[52] U.S. Cl. ........................................ 359/124; 359/128
[58] Field of Search ............... 359/124, 128, 182, 189, 359/191, 194, 192, 154; 370/122

[56] References Cited
U.S. PATENT DOCUMENTS

| | | | |
|---|---|---|---|
| 4,841,519 | 6/1989 | Nishio | 359/194 |
| 4,882,775 | 11/1989 | Coleman | 359/189 |
| 4,903,342 | 2/1990 | Yamazaki | 359/192 |
| 4,933,929 | 6/1990 | Tajima | 359/182 |
| 5,010,587 | 4/1991 | Eklund | 359/182 |

Primary Examiner—Edward L. Coles, Sr.
Assistant Examiner—Kinfe-Michael Negash
Attorney, Agent, or Firm—Sughrue, Mion, Zinn, Macpeak & Seas

[57] ABSTRACT

In a wavelength division multiplexed optical communication network which includes a transmitter including a multiplexing arrangement (15-17) for wavelength division multiplexing signal beams of a plurality of channels into the multiplexed signal beam for reception by at least one receiver (12) capable of producing a data carrying intermediate frequency signal by using a local optical beam in receiving the signal beam of a selected channel, the transmitter comprises a modulating arrangement (15) for frequency modulating optical beams of the channels into frequency modulated beams by channel discrimination signals (18) having different frequencies in correspondence to the channels before (19) the signal beams are multiplexed. Besides a receiving arrangement (21-25, 31-32, 35-38) for producing the data carrying intermediate frequency signal and prior to production thereof an information carrying intermediate frequency signal by using the local optical beam in receiving a multiplexed optical beam into which the frequency modulated beams are wavelength division multiplexed, the receiver comprises a detecting arrangement (26, 33-34) for detecting one of the channel discrimination signals in the information carrying intermediate frequency signal in correspondence to one of the channels that should be received as the selected channel. Besides a receiver circuit (21-25) and a level detector (31), the receiving arrangement comprises a scrambling (32, 35, 36) and a sweeping (35, 37, 38) arrangements.

7 Claims, 3 Drawing Sheets

WDM OPTICAL COMMUNICATION WHEREIN OPTICAL BEAMS ARE MODULATED BY CHANNEL DISCRIMINATION SIGNALS OF DIFFERENT FREQUENCIES BEFORE BY DATA SIGNALS

BACKGROUND OF THE INVENTION

This invention relates to wavelength division multiplexed (WDM) coherent optical communication, which is alternatively referred to either as frequency division multiplexed (FDM) coherent optical communication or briefly as wavelength division multiplexed optical communication.

The wavelength division multiplexed optical communication can deal with a great number of channels and is effective for use in a large-capacity trunk-line optical communication system. In a transmitter of a wavelength division multiplexed optical communication network, signal beams of a plurality of channels of different wavelengths are wavelength division multiplexed into a multiplexed signal beam for transmission through an optical fiber. In a receiver which is typically an optical heterodyne receiver, the multiplexed signal beam is received through the optical fiber by using a local optical beam of a controllable wavelength which is adjusted so as to produce a data carrying intermediate frequency signal in response to one of the signal beams of one of the channels that should be received as a selected channel.

In the transmitter, laser diodes are used in general as optical beam sources for generating optical beams of the respective channels. It is known that each laser diode emits the optical beam of a source wavelength which varies in a wide wavelength range dependent on a bias current supplied to the laser diode and its ambient temperature. The controllable wavelength is therefore swept as a swept wavelength in a sweep range during start of reception of the multiplexed signal beam and subsequently stabilized by automatic frequency control (AFC) at an optimum wavelength after the data carrying intermediate frequency signal is obtained in response to one of the signal beams that is of the selected channel.

The sweep range must be sufficiently wide to cover the wavelength range. It may therefore happen that the controllable wavelength is stabilized at a wrong wavelength rather than at a correct wavelength of providing the data carrying intermediate frequency signal in response to the signal beam of the selected channel, particularly when the channels are spaced apart by a narrow wavelength or frequency separation. As a consequence, it is indispensable to use a channel discrimination method of discriminating between the channels, namely, the correct wavelength from wrong wavelengths, in order to insure stabilization of the controllable wavelength at the correct wavelength. In a conventional channel discrimination method, channel discrimination bits of a set are time division multiplexed on the signal beam of each channel.

It should be noted in connection with such an optical communication network that the multiplexed signal beam has a polarization state which is unavoidably subjected to fluctuations while the multiplexed signal beam is transmitted from the transmitter to the receiver through the optical fiber. It is known in the art that polarization control is effective in removing adverse effects which would otherwise result from the fluctuations. On carrying out the polarization control, a polarization control unit is used in the receiver to control the polarization state of a predetermined one of the multiplexed signal beam and the local optical beam so that the polarization state of one of the multiplexed signal and the local optical beams becomes coincident with that of the other of the multiplexed signal and the local optical beams. Thereafter, the multiplexed signal and the local optical beams are combined together into a combined beam for detection of the data carrying intermediate frequency signal.

More particularly, the polarization control unit is controlled so that the data carrying intermediate frequency signal may always have a maximum power level. Consequently, the polarization control is not carried out while the receiver is not supplied with the multiplexed signal beam. This may result in a disadvantage such that the data carrying intermediate frequency signal can not be obtained either when the multiplexed signal beam is first supplied to the receiver or when supply of the multiplexed signal beam is once suspended and then restarted.

In order to get rid of the disadvantage, an optical heterodyne homodyne detection apparatus is revealed in U.S. Pat. No. 4,903,342 which is issued to Yamazaki, the present inventor. According to the Yamazaki patent, the polarization control unit is subjected to scramble control, namely, is scramble controlled during start of sweep of the controllable wavelength to vary the polarization state of the predetermined one of the multiplexed signal and the local optical beams in a scrambled fashion so as to insure production of the data carrying intermediate frequency signal irrespective of the polarization state of the multiplexed signal beam.

The scramble control, however, results in an inconvenience when used in combination with the conventional channel discrimination method. The inconvenience is as follows. Inasmuch as it is impossible to demodulate the data carrying intermediate frequency signal into a reproduction of the channel discrimination bits during progress of the scramble control, the scramble control must temporarily be suspended when an intermediate frequency signal is obtained as a temporary intermediate frequency signal. This is in order to judge whether or not the selected channel is really indicated by temporary channel discrimination bits which are demodulated from the temporary intermediate frequency signal as a reproduction of the channel discrimination bits of a certain set. If the selected channel is not indicated by the temporary channel discrimination bits, the scramble control must be repeated until the selected channel is really indicated by such temporary channel discrimination bits. As a result, a long searching time interval is necessary to search for the selected channel before start of reception of the signal beam of the selected channel.

SUMMARY OF THE INVENTION

It is therefore an object of the present invention to provide a wavelength division multiplexed coherent optical communication method in which sweep of a controllable wavelength of a local optical beam is carried out and in which a data carrying intermediate frequency signal can be obtained within a short time interval of searching for the intermediate frequency signal even when the optical communication method is used in combination with scramble control.

It is another object of this invention to provide a wavelength division multiplexed coherent optical communication method of the type described, according to which it is possible to discriminate between a plurality of channels during sweep of the controllable wavelength.

It is still another object of this invention to provide a transmitter for use in a wavelength division mulutlpixed coherent optical communication network which is for carrying out the wavelength division multiplexed coherent optical communication method of the type described.

It is yet another object of this invention to provide a receiver for use in a wavelength division multiplexed coherent optical communication network of the type described.

On describing the gist of this invention, it is possible to understand that a wavelength division multiplexed coherent optical communication method includes the steps of wavelength division multiplexing signal beams of a plurality of channels into a multiplexed signal beam and receiving the multiplexed signal beam by using a local optical beam to produce a data carrying intermediate frequency signal.

According to this invention, the above-understood wavelength division multiplexed coherent optical communication method is characterised by the steps of frequency modulating optical beams of the channels into frequency modulated beams by channel discrimination signals having different frequencies in correspondence to the channels before wavelength division multiplexing the signal beams, producing an information carrying intermediate frequency signal by using the local optical beam in receiving a multiplexed optical beam into which the frequency modulated beams are wavelength division multiplexed, and detecting one of the channel discrimination signals in the information carrying intermediate frequency signal in correspondence to one of the channels that should be received.

On describing the gist of an aspect of this invention, it is possible to understand that a transmitter is for use in a wavelength division multiplexed coherent optical communication network which includes a receiver for receiving a multiplexed signal beam by using a local optical beam to produce a data carrying intermediate frequency signal and that the transmitter includes multiplexing means for wavelength division multiplexing signal beams of a plurality of channels into the multiplexed signal beam.

According to the above-described aspect of this invention the above-understood transmitter is characterised by modulating means for frequency modulating optical beams of the channels into frequency modulated beams by channel discrimination signals having different frequencies in correspondence to the channels before the multiplexing means wavelength division multiplexes the signal beams. The multiplexing means is additionally used in wavelength division multiplexing the frequency modulated beams into a multiplexed optical beam.

On describing the gist of a different aspect of this invention, it is possible to understand that a receiver is for use in a wavelength division multiplexed coherent optical communication network which includes a transmitter for wavelength division multiplexing signal beams of a plurality of channels into a multiplexed signal beam, for frequency modulating optical beams of the channels into frequency modulated beams by channel discrimination signals having different frequencies in correspondence to the channels before wavelength division multiplexing the signal beams, and for wavelength division multiplexing the frequency modulated beams into a multiplexed optical beam and that the receiver includes receiving means for receiving the multiplexed optical beam by using a local optical beam to produce an information carrying intermediate frequency signal and for receiving the multiplexed signal beam by using the local optical beam to produce a data carrying intermediate frequency signal.

According to the different aspect of this invention, the above-understood receiver comprises detecting means connected to the receiving means for detecting one of the channel discrimination signals in the information carrying intermediate frequency signal in correspondence to one of the channels that should be received.

DESCRIPTION OF THE PREFERRED EMBODIMENTS

Figure 1:
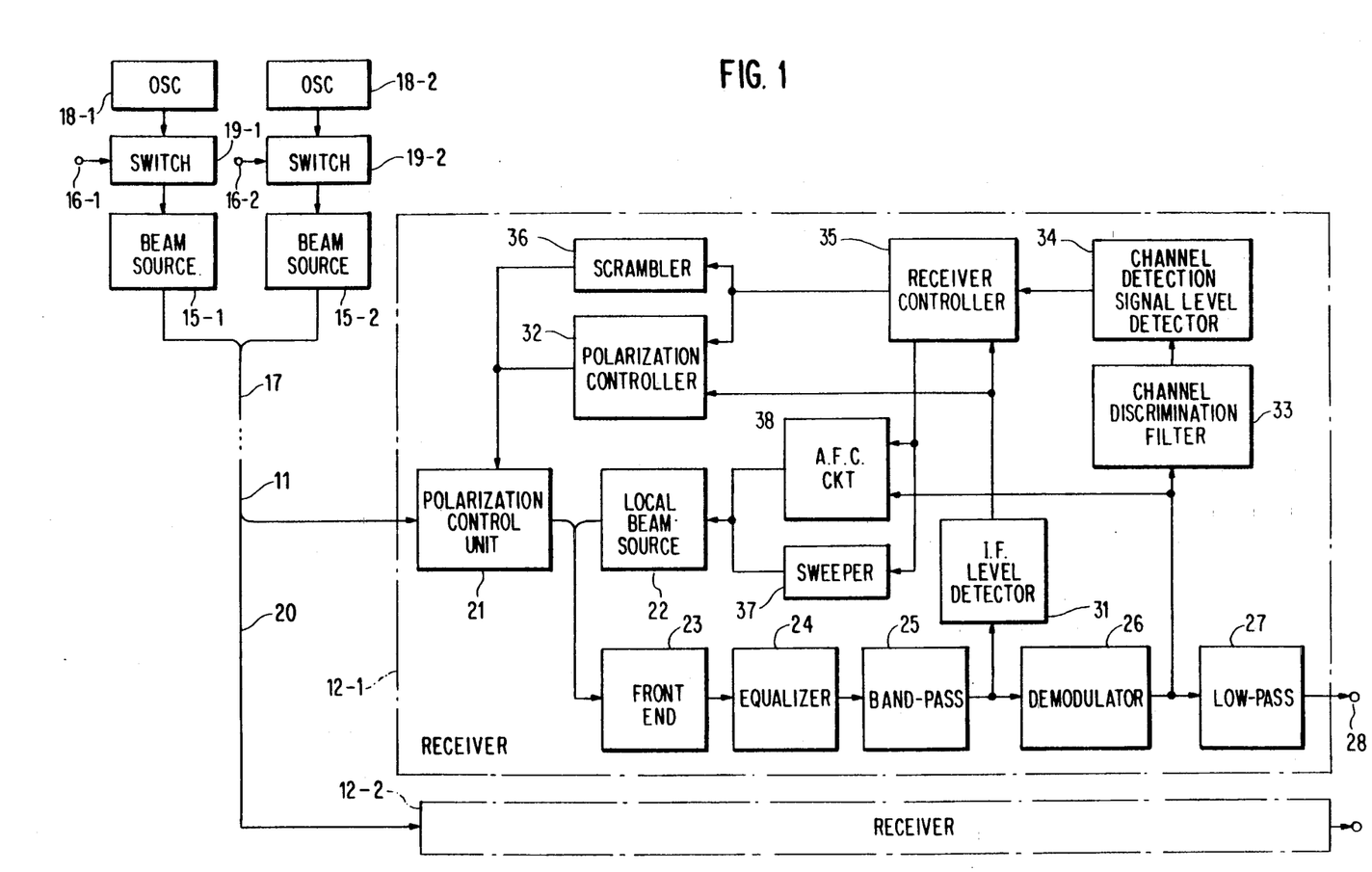
FIG. 1 is a block diagram of a wavelength division multiplexed coherent optical communication network for use in carrying out a wavelength division multiplexed coherent optical communication method according to a first embodiment of the instant invention.

Referring to FIG. 1, a wavelength division multiplexed coherent optical communication network is for use in carrying out a wavelength division multiplexed coherent optical communication method according to a first embodiment of the present invention. The word "coherent" will hereinafter be omitted merely for brevity of the description.

The wavelength division multiplexed optical communication network comprises a single-mode optical fiber 11 having first and second ends which will become clear as the description proceeds. The optical fiber 11 can serve as a bidirectional transmission path for transmitting a first wavelength division multiplexed signal beam from the first end to the second end and a second wavelength division multiplexed signal beam from the second end to the first end.

In the example being illustrated, a transmitter is connected to the first end and first and second receivers 12-1 and 12-2, to the second end. The optical fiber 11 therefore serves as a unidirectional transmission path for transmitting a single wavelength division multiplexed signal beam from the transmitter to the receivers 12 (suffixes omitted). The single wavelength division multiplexed signal beam may briefly be called a multiplexed signal beam. It is known that such a multiplexed signal beam has a polarization state or plane which is unavoidably subjected to fluctuations while the multiplexed signal beam is transmitted through the optical fiber 11. When used, the second wavelength division multiplexed signal beam is also subjected to the fluctuations while transmitted through the optical fiber 11 upward to the transmitter from another transmitter which will later be illustrated and which is either shared by the receivers 12 or is accompanied by each receiver.

In FIG. 1, the transmitter comprises first and second optical beam sources 15-1 and 15-2 for generating optical beams of a first channel of a first nominal wavelength or frequency and a second channel of a second nominal wavelength. In general, a laser diode is used in each of the optical beam sources 15 (suffixes omitted). The laser diode emits the optical beam with a source wavelength which varies in a wide wavelength range dependent on a bias current supplied to the laser diode and its ambient temperature. In any event, it will be assumed that the first and the second nominal wavelengths have a frequency separation of 15 GHz.

First and second data input terminals 16-1 and 16-2 are for supplying first and second data signals to the transmitter. Each data signal represents data which should be transmitted from the transmitter to at least one of the receivers 12. At the first and the second optical beam sources 15, the optical beams are frequency shift keying (FSK) modulated by the first and the second data signals into first and second signal beams. It will be assumed that the data input terminals 16 (suffixes omitted) are for supplying the transmitter with the data signals with a common bit rate of 2.5 Gb/s.

A transmitter optical combiner or coupler 17 comprises two optical fibers which are connected to the first and the second optical beam sources 15 and are fused together to the first end of the optical fiber 11. The optical combiner 17 is for combining or coupling the first and the second signal beams into the multiplexed signal beam and for supplying the multiplexed signal beam to the optical fiber 11. Preferably, each optical fiber of the optical combiner 17 is a polarization maintaining optical fiber.

First and second oscillators 18-1 and 18-2 are for generating sinusoidal signals of different frequencies for use as first and second channel discrimination signals indicative of the first and the second channels. It will be assumed that the first channel discrimination signal has a first channel discrimination frequency of 1 MHz and the second channel discrimination signal, a second channel discrimination frequency of 2 MHz.

First and second switches 19-1 and 19-2 are connected to the first and the second optical beam sources 15, the first and the second data input terminals 16, and the first and the second oscillators 18 (suffixes omitted). Before starting transmission of the multiplexed signal beam to the optical fiber 11, the first and the second switches 19 (suffixes omitted) are switched to supply the first and the second channel discrimination signals to the first and the second optical beam sources 15 during a predetermined time interval of, for example, five seconds. Thereafter, the switches 19 are switched to supply the first and the second data signals to the first and the second optical beam sources 15 to start transmission of the multiplexed signal beam.

At the first and the second optical beam sources 15, the optical beams are frequency modulated by the first and the second channel discrimination signals into first and second frequency modulated beams. The first frequency modulated beam is modulated at the first channel discrimination frequency and the second frequency demodulated beam, at the second channel discrimination frequency. The optical combiner 17 combines the first and the second frequency modulated beams into a multiplexed optical beam to supply the multiplexed optical beam to the optical fiber 11. The first and the second frequency modulated beams may have an amount of frequency shift of 1 GHz.

It is now understood in connection with the example so far described that the wavelength division multiplexed optical communication method includes the step of wavelength division multiplexing signal beams of a plurality of channels into a multiplexed signal beam. The method is characterised in part by the step of frequency modulating optical beams of the channels into frequency modulated beams by channel discrimination signals having different frequencies in correspondence to the channels before wavelength division multiplexing the signal beams into the multiplexed signal beam. The frequency modulated beams are wavelength division multiplexed into a multiplexed optical beam.

A second-end branching optical fiber 20 is connected to the second end of the optical fiber 11 to branch or divide first the multiplexed optical beam and subsequently the multiplexed signal beam for supply to the first and the second receivers 12. The branching optical fiber 20 is similar in structure to the transmitter optical combiner 17. Inasmuch as the receivers 12 are similar in structure, the description will be directed mainly to the first receiver 12-1, which will be referred to simply as a receiver 12. The multiplexed optical beam and the multiplexed signal beam will collectively be called an arriving beam unless discrimination is necessary therebetween.

Arriving at the receiver 12, the arriving beam is supplied to a polarization control unit 21 which may be any one of known polarization control units. For example, the polarization control unit 21 may be one described in the Yamazaki patent referred to hereinabove. Alternatively, the polarization control unit 21 may be one that is reported by H. Shimizu and three others at the 15th European Conference on Optical Communication, September 1989, and printed in the Proceedings, Volume 1, pages 343 to 346, under the title of "Highly Stable Polarization Controller Using Fiber Squeezers".

In the manner which will become clear as the description proceeds, the polarization control unit 21 first produces a polarization scrambled beam having a scrambled polarization state and thereafter a polarization stabilized beam having a stabilized polarization state or plane. The scrambled and the stabilized polarization states will collectively be called a controlled polarization state.

A local beam source 22 is for generating a local optical beam having a controllable wavelength. In the manner which will later become clear, the controllable wavelength is first swept in a sweep range into a swept wavelength and later stabilized at a stabilized wavelength. The local optical beam of the swept and the stabilized wavelengths has a local polarization state or plane. The polarization control unit 21 is for making, while the local optical beam has the swept wavelength, the stabilized polarization state coincident with the local polarization state or, more specifically, the stabilized polarization plane parallel to the local polarization plane.

The polarization scrambled and then stabilized beam and the local optical beam are combined by a receiver optical combiner into a combined beam, which is detected by a front end 23. Being an optical detector or photodetector, the front end 23 produces an intermediate frequency signal, on which intermediate frequency noise may be superposed and which is therefore called a noise including intermediate frequency signal. When the local optical beam has the swept and the stabilized wavelengths, the noise including intermediate frequency signal has a swept frequency and a stabilized frequency.

An equalizer 24 is for equalizing the noise including intermediate frequency signal into an equalized signal. A band-pass filter 25 is for removing the noise from the equalized signal to produce a noise removed intermediate frequency signal which is an information carrying intermediate frequency signal and a data carrying intermediate frequency signal when the noise including intermediate frequency signal has the swept and the stabilized frequencies. For the numerical example described in connection with the transmitter, the band-pass filter 25 preferably has a passband between 1 GHz and 5 GHz.

The information carrying intermediate frequency signal is so called because it carries the channel discrimination signals of the channel discrimination frequencies as channel information. The data carrying intermediate frequency signal carries one of the data signals that is determined as a selected signal by the stabilized wavelength of the local optical beam and consequently by the stabilized frequency of the noise including intermediate frequency signal.

A delay detection circuit 26 is a demodulator for demodulating the noise removed intermediate frequency signal into a baseband signal, on which baseband noise may be superposed and which is therefore called a noise including baseband signal. When demodulated from the information carrying intermediate frequency signal of the swept frequency, the noise including baseband signal is first a succession of reproductions of the channel discrimination signals of the channel discrimination frequencies and is called an information carrying baseband signal. The reproductions of the channel discrimination signals will be referred to merely as the channel discrimination signals. When demodulated from the data carrying intermediate frequency signal of the stabilized frequency, the noise including baseband signal is later a noise including reproduction of the selected signal.

In the manner known in the art, the delay detection circuit 26 comprises a delay line and a mixer (both being not shown). In the example being illustrated, the delay line gives a delay to the noise removed intermediate frequency signal so that the noise including baseband signal may have a maximum amplitude when the noise removed intermediate frequency signal has its center frequency at 3 GHz. In other words, the noise including baseband signal has a direct-current component which crosses a zero-volt line when the stabilized frequency is equal to 3 GHz.

A low-pass filter 27 is for removing the baseband noise from the noise including reproduction of the selected signal to supply a receiver output terminal 28 with a reproduction of the data signal of one of the channels that is selected as a selected channel by the stabilized wavelength of the local optical beam and therefore by the stabilized frequency of the noise including intermediate frequency signal.

From the band-pass filter 26, the noise removed intermediate frequency signal is delivered furthermore to an intermediate frequency signal level detector 31 for detecting an intermediate frequency signal level of the noise removed intermediate frequency signal to produce a level signal representative of the intermediate frequency signal level. The level signal will be said to have a first signal level before and after detection of the indermediate frequency signal level and to have a second signal level during detection of the intermediate frequency signal level. Depending on the circumstances, the intermediate frequency signal level detector 31 will be referred to simply as a level detector.

Supplied with the level signal and controlled in the manner which will presently be described, a polarization controller 32 delivers a polarization control signal to the polarization control unit 21 as soon as one of the channel discrimination signals is detected in the information carrying intermediate frequency signal or, more particularly, in the information carrying baseband signal, in correspondence to one of the channels that should be received as the selected channel. The polarization control signal controls the polarization control unit 21 so as to keep the intermediate frequency signal level of the noise removed intermediate frequency signal always maximum. It is readily possible to implement the polarization controller 32 by a microprocessor.

In the receiver disclosed in the Yamazaki patent cited heretobefore, channel discrimination is carried out by using the conventional channel discrimination method described before. The noise including baseband signal is therefore delivered from a demodulator (which is the delay detection circuit 26 in the example herein illustrated with reference to FIG. 1) to a channel discrimination circuit (herein not shown) for detecting the channel discrimination bits in the noise including baseband signal. Until the channel discrimination bits are detected to indicate the selected channel, the controllable wavelength is repeatedly swept with the scramble control temporarily suspended. This necessitates a long searching time interval in the manner pointed out hereinabove.

In FIG. 1, the noise including basabend signal is delivered to a channel discrimination filter 33 rather than to the channel discrimination circuit described in the Yamazaki patent. The channel discrimination filter 33 is a band-pass filter having a narrow passband and a high Q of, for example, one hundred and is for producing a channel detection signal having a channel detection signal level which has a sharp maximum when the noise including baseband signal becomes to have one of the channel discrimination frequencies that is equal to the center frequency of the narrow passband. The channel detection signal is a reproduction of one of the channel discrimination signals that indicates the selected channel by the above-mentioned one of the channel discrimination frequencies.

Supplied with the channel detection signal, a channel detection signal level detector 34 produces a receiver control signal which represents a first and a second control value when the channel detection signal has and has not the sharp maximum. In other words, the receiver control signal represents the first control value while the above-mentioned one of the channel discrimination signal is not detected. The receiver control signal represents the second control value only when one of the channel discrimination signals indicates the selected channel. Inasmuch as the channel detection signal level rises to the sharp maximum at the earliest when the information carrying intermediate frequency signal is detected, the receiver control signal instantaneously represents the second control value while the channel detection signal level is the second signal level.

Conveniently, the receiver control signal builds up from a low level to a high level when the channel detection signal level is low and instantaneously rises to the sharp maximum. The receiver control signal builds down from the high level back to the low level when the sharp maximum disappears from the channel detection signal level.

It is possible to presume without loss of generality that the channel discrimination filter 33 has its center frequency of the passband in the first receiver 12-1 at the first channel discrimination frequency of 1 MHz and may be called a first channel discrimination filter which makes the channel discrimination signal level become the sharp maximum when the first channel discrimination signal of the first channel discrimination frequency is detected in the noise including baseband signal. A second channel discrimination filter (not shown) may be used in the second receiver 12-2 to have a center frequency of its passband at the second channel discrimination frequency of 2 MHz and to make a like channel detection signal rise to a similarly sharp maximum when the second channel discrimination signal of the second channel discrimination frequency is found in a like noise including baseband signal produced in the second receiver 12-2.

It is possible to substitute for the channel discrimination filter 33 a plurality of parallel-connected channel discrimination filters in each of the receivers 12 for manual or otherwise selection of one of the parallel-connected channel discrimination filters that has a center frequency of its passband in correspondence to one of the channels that is desired. Alternatively, the channel discrimination filter 33 may be a band-pass filter which has a manually or otherwise controllable center frequency. It should, however, be noted that such a use of the channel discrimination filter 33 is not usual when the wavelength division multiplexed optical communication network is a trunk-line wavelength division multiplexed optical communication system.

A receiver controller 35 is either a part of the microprocessor used as the polarization controller 32 or a monostable multivibrator and is supplied with the level signal from the intermediate frequency signal level detector 31 and with the receiver control signal from the channel detection signal level detector 34. Before arrival of the arriving beam at the receiver 12, the level signal has the first signal level. The receiver control signal has the low level. Under the circumstances, the receiver controller 35 delivers a scramble control signal to the polarization controller 32 and a polarization state scrambler 36 and a sweep control signal to a sweeper 37 and an automatic frequency control (AFC) circuit 38.

The scramble control signal has a first and a second scramble control level when the level signal has the first and the second signal levels. The sweep control signal has a first and a second sweep control level before and after the receiver control signal instantaneously represents the second control value. More in detail, the sweep control signal has the first sweep control level while the receiver control signal represents the first control value before it represents the second control value. The receiver controller 35 suspends monitor of the receiver control signal after the receiver control signal builds down from the high level to the low level until the second signal level of the level signal becomes the first signal level.

The scramble control signal of the first scramble control level keeps the polarization controller 32 out of operation and the polarization state scrambler 36 in operation. The sweep control signal of the first sweep control level keeps the sweeper 37 in operation and the automatic frequency control circuit 38 out of operation. It will be surmised that the local beam source 22 is put into operation before the arriving beam begins to reach the receiver 12.

While kept in operation, the polarization state scrambler 36 generates a triangular or saw-tooth signal which has a scrambling frequency of, for example, 1 kHz. The triangular signal is supplied to the polarization control unit 21 which is not yet supplied with the polarization control signal from the polarization controller 32 because the polarization controller 32 is kept out of operation by the scramble control signal of the first scramble control level. The triangular signal serves as a polarization scrambling signal for making the polarization control unit 21 produce the polarization scrambled beam having the scrambled polarization state, namely, for subjecting the controlled polarization state to the scramble control.

While kept in operation, the sweeper 37 supplies the local beam source 22 with a bias sweep signal. The local beam source 22 includes a bias current source (not shown). The bias sweep signal sweeps the bias current source to sweep the controllable wavelength in the sweep range of, for example, 50 GHz at a sweep period which may be one second long.

The controlled polarization state is therefore scrambled while the controllable wavelength is swept. It is therefore possible for the front end 23 to produce the noise including intermediate frequency signal of the swept frequency irrespective of fluctuations in the polarization state of the arriving beam, namely, whatever polarization state the arriving beam may have.

Soon after the multiplexed optical beam begins to arrive at the receiver 12 while the local optical beam is given the scrambled polarization state and furthermore the swept wavelength, the band-pass filter begins to produce the information carrying intermediate frequency signal with the swept frequency. The level signal becomes to have the second signal level. This makes the receiver controller 35 switch the scramble control signal from the first scramble control level to the second scramble control level. The scramble control signal of the second scramble control level suspends operation of the polarization state scrambler 36 and puts the polarization controller 32 into operation. The controlled polarization state of the local optical beam is therefore put into an optimum polarization state and is kept at the stabilized polarization state mentioned before. Inasmuch as the sweep control signal still has the low level, the receiver controller 35 keeps production of the sweep control signal of the first sweep control level to keep the sweeper 37 in operation.

Inasmuch as the controlled polarization state is kept at the stabilized polarization state with the controllable wavelength continuously repeatedly swept, the delay detection circuit 26 produces the channel discrimination signals which are carried by the information carrying intermediate frequency signal and have the channel discrimination frequencies indicative of all the channels used in the wavelength division multiplexed optical communication network. In compliance with the selected channel, the channel discrimination filter 33 produces the channel detection signal with the sharp maximum. The receiver control signal is therefore switched from the low level to the high level. This makes the receiver controller 35 switch the sweep control signal from the first sweep control level to the second sweep control level to suspend operation of the sweeper 37 and to put the automatic frequency control circuit 38 into operation.

When put out of operation, the sweeper 37 no more sweeps the bias current source but keeps the bias current at a stationary value at which the controllable wavelength becomes an optimum wavelength for making the receiver 12 ready to receive the data signal of the selected channel in the multiplexed signal beam. When put into operation, the automatic frequency control circuit 38 converts the direct-current component of the noise including intermediate frequency signal to a bias stabilizing signal which takes over the bias sweep signal to stabilize the bias current at the stationary value and to keep the optimum wavelength as the stabilized wavelength.

In this manner, the controlled polarization state is stabilized at the stabilized polarization state. After the controlled polarization state is stabilized with the controllable wavelength continuously repeatedly swept, the receiver 12 is capable of detecting the channel discrimination signal indicative of any one of the channels that is selected as the selected channel. The controllable wavelength is subsequently stabilized at the optimum or the stabilized wavelength as soon as the channel discrimination signal of the selected channel is found in the noise including basebnd signal to make the receiver control signal instantaneously rise to the high level, namely, instantaneously represent the second control value. This operation ends within two seconds from start of arrival of the multiplexed optical beam.

When the multiplexed signal beam begins to reach the receiver 12, the band-pass filter 24 produces the data carrying intermediate frequency signal having an intermediate frequency which is determined by the stabilized wavelength. Supplied with the level signal which continuously and substantially has the second signal level, the receiver controller 35 keeps the polarization controller 21 keep the stabilized polarization state. Inasmuch as the receiver controller 35 neglects the receiver control signal representative of the first control value until the level signal is switched from the second signal level to the first signal level, the receiver controller 35 makes the automatic frequency control circuit 38 keep the stabilized wavelength. The low-pass filter 27 supplies the receiver output terminal 28 with the reproduction of the data signal of the selected channel.

When supply of the multiplexed signal beam to the receiver 12 comes to an end, the intermediate frequency signal level detector 31 turns the level signal from the second signal level to the first signal level. This makes the receiver controller 35 again begin to monitor the receiver control signal supplied thereto from the channel detection signal level detector 34.

It will readily be seen that the receiver 12 is different in various respects from that described in the Yamazaki patent. Among the various differences, important are substitution of a combination of the channel discrimination filter 33 and the channel detection signal level detector 34 for the channel discrimination circuit used in the Yamazaki patent and use of the receiver controller 35. In other respects, it is possible to modify the receiver according to teachings of the Yamazaki patent.

It is now understood in connection with the illustrated example that the above-described wavelength division multiplexed optical communication method additionally includes the step of receiving the multiplexed signal beam by using a local optical beam to produce a data carrying intermediate frequency signal. As a remaining part, the method is characterised by the steps of producing an information carrying intermediate frequency signal by using the local optical beam in receiving a multiplexed optical beam into which the frequency modulated beams are wavelength division multiplexed, and detecting one of the channel discrimination signals in the information carrying intermediate frequency signal in correspondence to one of the channels that should be received as a selected channel.

It is furthermore understood that a transmitter is for use in a wavelength division multiplexed optical communication network which includes at least one receiver (12) for receiving a multiplexed signal beam by using a local optical beam to produce a data carrying intermediate frequency signal and that the transmitter includes a multiplexing arrangement (15 to 17) for wavelength division multiplexing signal beams of a plurality of channels into the multiplexed signal beam. The data carrying intermediate frequency signal is produced by using the local optical beam in receiving one of the signal beams of one of the channels that should be receives as a selected channel. The transmitter is characterised by a modulating arrangement (15, 18, and 19) for frequency modulating optical beams of the channels into frequency modulated beams by channel discrimination signals having different frequencies in correspondence to the channels before the multiplexing arrangement wavelength division multiplexes the signal beams into the multiplexed signal beam. In the transmitter, the multiplexing arrangement is used in additionally wavelength division multiplexing the frequency modulated beams into a multiplexed optical beam.

The receiver therefore includes a receiving arrangement (21 to 25, 31, 32, and 35 to 38) for receiving the multiplexed signal beam by using the local optical beam to produce the data zarrying intermediate frequency signal and furthermore for receiving the multiplexed optical beam by using the local optical beam of a swept wavelength to produce an information carrying intermediate frequency signal. The receiver comprises a detecting arrangement (26, 33, and 34) connected to the receiving arrangement for detecting one of the channel discrimination signals in the information carrying intermediate frequency signal in correspondence to one of the channels that should be received.

In the transmitter, the multiplexing arrangement comprises a beam generating arrangement (15) for generating the optical beams, a signal supplying arrangement (16) for supplying data signals to the beam generating arrangement to make the beam generating arrangement convert the optical beams to the signal beams in accordance with the data signals, and a combining arrangement (17) for combining the signal beams into the multiplexed signal beam. The modulating arrangement is characterised by oscillators (18) for generating the channel discrimination signals and a swiching arrangement (19) connected to the beam generating and the signal supplying arrangements and to the oscillators for first supplying the channel discrimination signals to the beam generating arrangement to make the beam generating arrangement frequency modulate the optical beams into the frequency modulated beams and for thereafter switching supply of the channel discrimination signals to the beam generating arrangement to supply of the data signals to the beam generating arrangement. In the transmitter, the combining arrangement is used in additionally combining the frequency modulated beams into the multiplexed optical beam.

In connection with the receiver, it is convenient to say that the receiver is supplied as an arriving beam first with the multiplexed optical beam and subsequently with the multiplexed signal beam. The detecting arrangement is for producing a receiver control signal and for making the control signal represent a first and a second control value while the above-mentioned one of the channel discrimination signals is not detected and instantaneously when this one of the channel discrimination signal is detected. The receiving arrangement comprises (1) a receiver circuit (21 to 26) for receiving the arriving beam by using the local optical beam to produce the information carrying and the data carrying intermediate frequency signals with a substantially common intermediate frequency signal level and (2) a level detector (31) connected to the receiver circuit for detecting the intermediate frequency signal level to produce a level signal and for making the level signal have a first and a second signal level before and after detection of the intermediate frequency signal level and during detection of the intermediate frequency signal level and is characterised by (A) a scrambling arrangement (32, 35, and 36) connected to the receiver circuit and the level detector for making a predetermined one of the arriving and the local optical beams have a scrambled and a stabilized polarization state while the level signal has the first and the second signal levels and (B) a sweeping arrangement (35, 37, and 38) connected to the receiver circuit, the level detector, and the detecting arrangement for making the local optical beam have a swept and a stabilized wavelength before and after the receiver control signal instantaneously represents the second control value, the sweeping arrangement making the local optical beam again have the swept wavelength when the level signal has the first signal level after once having had the second signal level. Incidentally, the receiver control signal becomes to instanateously represent the second control value while the level signal has the second signal level.

In the receiver, (I) the scrambling and the sweeping arrangements include in common a controller (35) connected to the level detector and the detecting arrangement to produce a scramble control signal and a sweep control signal with the scramble control signal made to have a first and a second scramble control level when the level signal has the first and the second signal levels and with the sweep control signal made to have a first and a second sweep control level before and after the receiver control signal instantaneously represents the second control value and made again to have the first sweep control level after turn of the level signal from the second signal level to the first signal level, (II) the scrambling arrangement comprises a scrambling circuit (32 and 36) connected to the receiver circuit and the controller for making the predetermined one of the arriving and the local optical beams have the scrambled and the stabilized polarization states when the scramble control signal has the first and the second scramble control levels, and (III) the sweeping arrangement comprises a sweeping circuit (37 and 38) connected to the receiver circuit and the controller for making the local optical beam have the swept and the stabilized wavelengths when the sweep control signal has the first and the second sweep control levels.

When attention is directed to a different part of the receiver, it is understood that the detecting arrangement is characterised by (i) a filter arrangement (26 and 33) connected to the receiving arrangement and operable at a selected frequency selected from the different frequencies in correspondence to the above-mentioned one of the channels to detect one of the channel discrimination signals in the information carrying intermediate frequency signal that has the selected frequency to be the afore-mentioned one of the channel discrimination signals and has a channel detection signal level, and (ii) a signal producing circuit (34) connected to the filter arrangement for producing the receiver control signal by detecting the channel detection signal level and for making the receiver control signal represent the first and the second control values before the channel detection signal level is detected and instantaneously when the channel detection signal level is detected.

Figure 2:
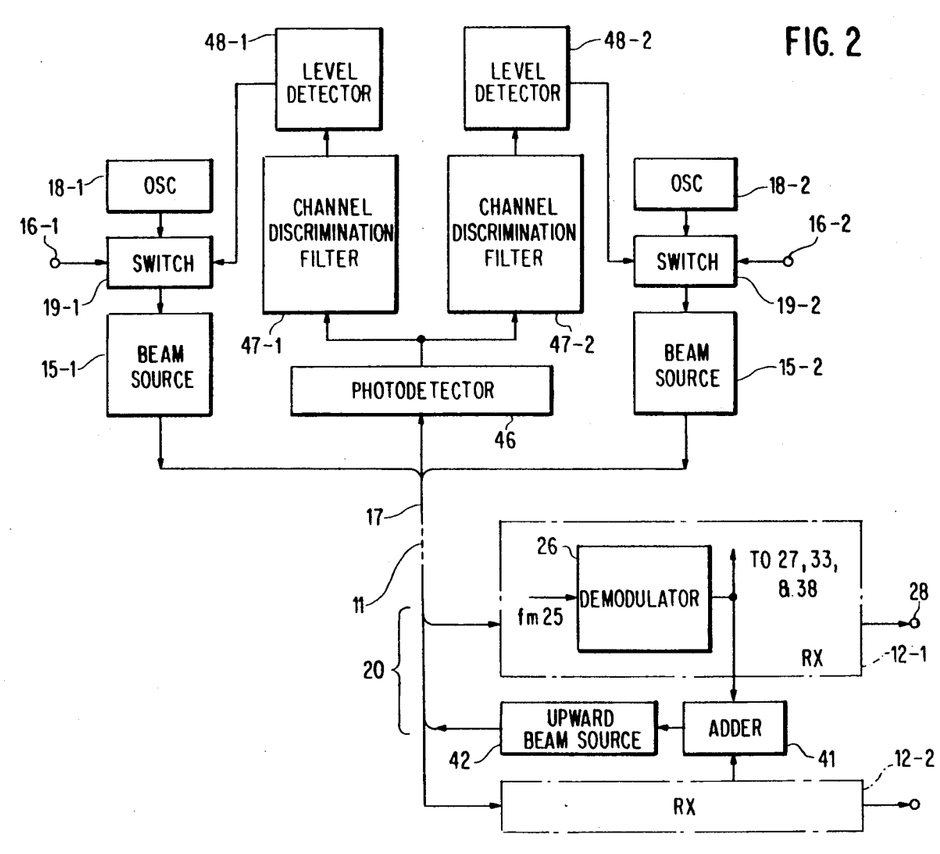
FIG. 2 is a block diagram of another wavelength division multiplexed coherent optical communication network for use in carrying out a wavelength division multiplexed coherent optical communication method according to a second embodiment of this invention.

Referring now to FIG. 2, a different wavelendh division multiplexed optical communication network is for use in carrying out a wavelength division multiplexed optical communication method according to a second embodiment of this invention. The different wavelength division multiplexed optical communication network comprises similar parts which are designated by like reference numerals and are similarly operable with likewise named optical beams and electric signals. It should be noted that most parts of the first receiver 12-1 is not illustrated in FIG. 2 because these parts are not different from those depicted in FIG. 1.

In FIG. 2, the noise including baseband signals are supplied to a baseband signal adder 41 from the delay detection circuit 26 of the first receiver 12-1 and from a corresponding circuit (not shown) of the second receiver 12-2. It will be presumed without loss of generality that one and the other of the first and the second receivers 12 are for receiving the signal beams of the first and the second channels. Under the circumstances, the adder 41 produces a sum signal comprising the channel discrimination signals of the first and the second channel discrimination frequencies when the information carrying baseband signals are produced by the delay detection circuits, such as 26.

A common upward going optical beam source 42 is for generating a common upward going optical beam of an upward going beam nominal wavelength and is supplied with the sum signal to intensity modulate the upward going optical beam by the sum signal into an upward going signal beam. The second-end branching optical fiber 20 comprises an additional optical fiber between the upward going optical beam source 42 and the second end of the optical fiber 11 to deliver the upward going signal beam upward to the transmitter.

The transmitter optical combiner 17 comprises an additional optical fiber for delivering the upward going signal beam to a transmitter optical detector or photodetector 46 which detects the upward going signal beam to produce a transmitter intermediate frequency signal. When the channel discrimination signals are detected by the respective receivers 12, the transmitter intermediate frequency signal carries reproductions of the first and the second channel discrimination signals indicative of the first and the second channels. The transmitter optical detector 46 may include a scrambling and a sweeping arrangment of the type described above.

In the transmitter, first and second channel discrimination filters 47-1 and 47-2 are supplied with the transmitter intermediate frequency signal to produce first and second channel discrimination signals. First and second channel discrimination or detection signal level detectors 48-1 and 48-2 are supplied with the first and the second channel discrimination signals to produce first and second switch control signals.

Each of the first and the second channel discrimination filters 47 (suffixes omitted) is similar in structure and operation to the channel discrimination filter 33 described in conjunction with FIG. 1 except for the fact that the first and the second channel discrimination filters 47 have their center frequencies at the first and the second channel discrimination frequencies. Each of the first and the second channel discrimination signal level detectors 48 (suffixes omitted) is similar to the channel detection signal level detector 34.

As a consequence, the first switch control signal has a control signal value varying from a first control value to a second control value or builds up from a low level to a high level when one of the receivers 12 produces the first channel discrimination signal as a part of the information carrying baseband signal. Likewise, the second switch control signal builds up from the low level to the high level when the other of the receivers 12 produces the second channel discrimination signal as another part of the information carrying baseband signal.

The first switch 19-1 is supplied with the first switch control signal to switch supply to the first optical beam source 15-1 from the first channel discrimination signal to the first data signal when the first switch control signal builds up from the low level to the high level. The second switch 19-2 is supplied with the second switch control signal to switch supply to the second optical beam source 15-2 from the second channel discrimination signal to the second data signal upon build up of the second switch control signal from the low level to the high level. It is now understood that transmission of the first and the second channel discrimination signals from the transmitter to the receivers 12 is automatically switched to transmission of the first and the second data signals as soon as the channel discrimination signals are reproduced in the receivers 12 to indicate the selected channels and that the channel discrimination signals are automatically switched to the data signals in the transmitter irrespective of time instants at which the receivers 12 are put into operation.

It is understood in connection with the example illustrated with reference to FIG. 2 that the receiving arrangement of the receiver comprises a receiver circuit (21 to 25, 31, 32, and 35 to 38) for receiving the multiplexed optical beam by using the local optical beam to produce the information carrying intermediate frequency signal and a demodulating arrangement (26) connected to the receiver circuit for demodulating the information carrying intermediate frequency signal into an information carrying baseband signal. The receiver is characterized by an upward going signal beam generating arrangement (41 and 42) connected to the demodulating arrangement for generating an upward going signal bema in accordance with the information carrying baseband signal.

Figure 3:
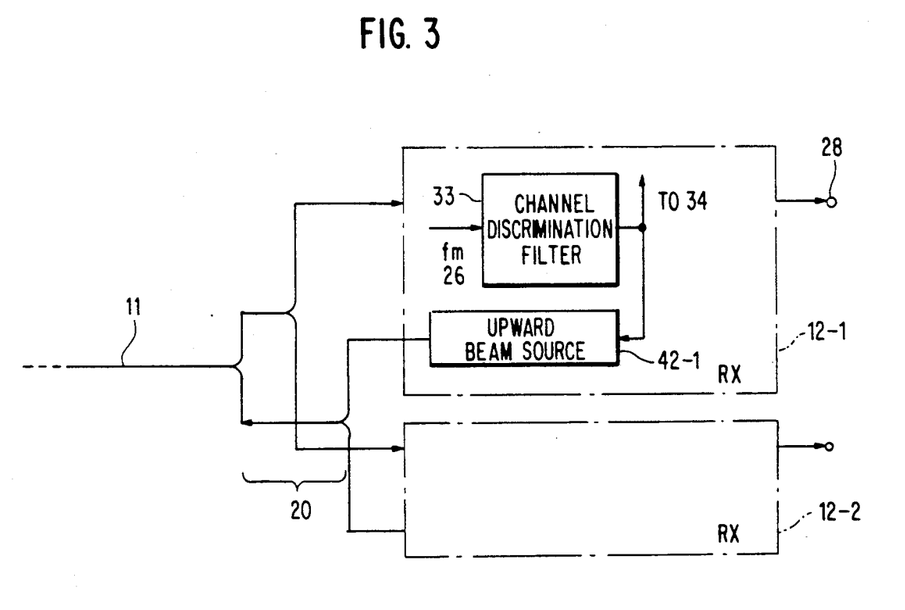
FIG. 3 is a partial block diagram of a modification of the wavelength division multiplexed coherent optical communication network illustrated in FIG. 2.

Turning to FIG. 3, a modified wavelength division multiplexed optical communication network is a modification of the wavelength division multiplexed optical communication network illustrated with reference to FIG. 2. The modified wavelength division multiplexed optical communication network comprises similar parts which are again designated by like reference numerals and are similarly operable with likewise named optical beans and electric signals.

In FIG. 3, the first receiver 12-1 comprises a first upward going optical beam source 42-1 for generating a first upward going optical beam of the upward going beam nominal wavelength. From the channel discrimination filter 33, a first reproduced channel discrimination signal is delevered to the upward going optical beam source 41-1. It should be noted that the first reproduced channel discrimination signal has a selected frequency selected from the different frequencies in correspondence to one of the channels that should be selected.

At the first upward going optical beam source 42-1, the first upward going optical beam is either intensity or frequency modulated by the first reproduced channel discrimination signal into a first upward going signal beam. An additional optical fiber of the second-end branching optical fiber 20 delivers the first upward going signal beam to the optical fiber 11 for upward transmission to the transmitter.

In each of FIGS. 2 and 3, the receivers 12 may be first (12-1) through M-th (12-M) receivers, where M represents an integer which is at least two, particularly when the transmitter deals with M channels. In this event, each receiver should include an m-th upward going optical beam source 42-m (not shown) for generating an m-th upward going optical beam of the upward going beam nominal wavelength according to the modification being illustrated, where m is variable between 1 and M, both inclusive. Even under the circumstances, the transmitter may be as described in conjunction with FIG. 2. Incidentally, the local optical beam can be given the stabilized wavelength in each of the first through the M-th receivers 12-1 to 12-M two seconds after start of arrival of the modulated optical beam in the manner described in connection with FIG. 1.

Reviewing FIG. 3, it is understood that the detecting arrangement (26, 33, and 34) is operable at a selected frequency selected from the different frequencies in correspondence to the above-mentioned one of the channels to detect the above-mentioned one of the channel discrimination signals that has the selected frequency. The receiver is characterized by an upward going signal beam generating arrangement (42-1) connected to the detecting arrangement for generating an upward going signal beam in accordance with this one of the channel discrimination signals.

Reviewing FIGS. 1 and 3, it is now understood that the switching arrangement (19) of the transmitter may be for switching supply of the channel discrimination signals to supply of the data signals a predetermined time interval (at least two seconds) after start of supply of the channel discrimination signals.

Alternatively, the switching arrangement (19) is for use in a transmitter operable in cooperation with a receiver for receiving the multiplexed optical beam by using the local optical beam to produce an information carrying intermediate frequency signal, detecting one of the channel discrimination signals in the information carrying intermediate frequency signal in correspondence to one of the channels that should be received, and transmitting an upward going signal beam to the transmitter when the above-mentioned one of the channel discrimination signals is detected. The switching arrangement is characterized by switches (19) connected to the beam generating (15) and the signal supplying (16) arrangements and the oscillators (18) for first supplying the channel discrimination signals to the beam generating arrangement and for thereafter switching supply of the channel discrimination signals to supply of the data signals and a detecting arrangement (46 to 48) connected to the switches for detecting the upward going signal beam to produce a switch control signal and for delivering the switch control signal to one of the switches that first supplies the above-mentioned one of the channel discrimination signals to the beam generating arrangement. The detecting arrangement thereby makes the above-mentioned one of the switches switch supply of the above-mentioned one of the channel discrimination signals to supply of one of the data signals that is of the above-mentioned one of the channels.

While this invention has thus far been described in specific conjunction with only two preferred embodiments thereof and a few modifications, it will now be readily possible for one skilled in the art to carry this invention into effect in various other manners. For example, it is possible to modulate the optical beams of the respective channels at the signal beam sources 15 by the data signals according to either amplitude shift keying (ASK) or phase shift keying (PSK). It should be clearly understood that the numerical example is described merely by way of example. When it is desired to start transmission of a signal beam of a new channel by the transmitter during progress of transmission of signal beams of one or more channels, it is possible to continue transmission of the signal beams of the one or more channels and to transmit the frequency modulated beam of the new channel either during the predetermined time interval or until reception of the upward going signal beam by the transmitter before starting transmission of the signal beam of the new channel.

What is claimed is:

1. A wavelength division multiplexed coherent optical communication system including a transmitter for transmitting an N-channel multiplexed signal beam and a receiver for receiving the N-channel multiplexed signal beam by using a local optical beam to produce a data carrying intermediate frequency signal, said transmitter comprising:
   N signal supplying means for supplying N channel data, respectively;
   N oscillators for generating N channel discrimination signals having different frequencies in correspondence to said channels, respectively;
   N switching means each being supplied to one of said N channel discrimination signals and one of said N channel data, respectively for first supplying said one of N channel discrimination signals to one of N beam generating means, respectively and for thereafter supplying said one of channel data to said one of N beam generating means, respectively;
   said N beam generating means connected to one of said N switching means, respectively for generating N frequency modulated beams; and
   combining means for combining said N frequency modulated beams into said N channel multiplexed signal beam.

2. A wavelength division multiplexed coherent optical communication system as claimed in claim 1, wherein said switching means is for switching supply of said channel discrimination signals to supply of said data signals a predetermined time interval after start of supply of said channel discrimination signals.

3. A wavelength division multiplexed coherent optical communication system as claimed in claim 1, wherein said receiver receiving said multiplexed optical beam by using said local optical beam to produce an information carrying intermediate frequency signal, detecting one of said channel discrimination signals in said information carrying intermediate frequency signal in correspondence to one of said channels that should be received, and transmitting an upward going signal beam to said transmitter when said one of the channel discrimination signal is detected, wherein said switching means comprises:
   switches connected to said beam generating and said signal supplying means and said oscillators for first supplying said channel discrimination signals to said beam generating means and for thereafter switching supply of said channel discrimination signals to supply of said data signals; and
   detecting means connected to said switches for detecting said upward going signal beam to produce a switch control signal and for delivering said switch control signal to one of said switches that first supplies said one of the channel discrimination signals to said beam generating means, said detecting means thereby making said one of the switches switch supply of said one of the channel discrimination signals to supply of one of said data signals that is of said one of the channels.

4. In a wavelength division multiplexed coherent optical communication system including a transmitter and a receiver, said transmitter for wavelength division multiplexing signal beams of a plurality of channels into a multiplexed signal beam, and for frequency modulating optical beams of a plurality of channels into frequency modulated beams by channel discrimination signals having different frequencies in correspondence to said channels before wavelength division multiplexing said signal beams, said receiver including receiving means for receiving said multiplexed optical beam by using a local optical beam to produce an information carrying intermediate frequency signal and for receiving said multiplexed signal beam by using said local optical beam to produce a data carrying intermediate frequency signal, said receiver comprising detecting means connected to said receiving means for detecting one of said channel discrimination signals in said information carrying intermediate frequency signal in correspondence to one of said channels that should be received said receiver being supplied, as an arriving beam, first with said multiplexed optical beam and subsequently with said multiplexed signal beam, wherein:
   said detecting means is for producing a receiver control signal and for making said control signal represent a first control value while said one of the channel discrimination signals is not detected, said detecting means making said control signal represent a second control value instantaneously when said one of the channel discrimination signals is detected;
   said receiving means comprising:
   a receiver circuit for receiving said arriving beam by using said local optical beam to produce said information carrying and said data carrying intermediate frequency signals with a substantially common intermediate frequency signal level;
   a level detector connected to said receiver circuit for detecting said intermediate frequency signal level to produce a level signal and for making said level signal have a first signal level before and after detection of said intermediate frequency signal level, said level detector making said level signal have a second signal level while said intermediate frequency signal level is detected, said receiver control signal becoming to instantaneously represent said second control value while said level signal has said second signal level;

scrambling means connected to said receiver circuit and said level detector for making a predetermined one of said arriving and said local optical beams have a scrambled and a stabilized polarization while said level signal has said first and said second signal levels; and sweeping means connected to said receiver circuit, said level detector, and said detecting means for making said local optical beam have a swept and a stabilized wavelength before and after said receiver control signal instantaneously said second control value, said sweeping means making said local optical beam again have said swept wavelength when said level signal has said first signal level after once having had said second signal level.

5. In a wavelength division multiplexed coherent optical communication system including a transmitter and a receiver as claimed in claim 4, wherein:

said scrambling and said sweeping means include a controller in common, said controller being connected to said level detector and said detecting means to produce a scramble control signal and a sweep control signal, said scramble control signal having a first and a second scramble control level when said level signal has said first and said second signal levels, said sweep control signal having a first and a second sweep control level before and after said receiver control signal instantaneously represents said second control value;

said scrambling means comprising a scrambling circuit connected to said receiver circuit and said controller for making said predetermined one of the arriving and the local optical beams have said scrambled and said stabilized polarization states when said scramble control signal has said first and said second scramble control levels;

said sweeping means comprising a sweeping circuit connected to said receiver circuit and said second controller for making said local optical beam have said swept and said stabilized wavelengths when said sweep control signal has said first and said second sweep control levels.

6. In a wavelength division multiplexed coherent optical communication system including a transmitter and a receiver, said transmitter for wavelength division multiplexing signal beams of a plurality of channels into a multiplexed signal beam, and for frequency modulating optical beams of a plurality of channels into frequency modulated beams by channel discrimination signals having different frequencies in correspondence to said channels before wavelength division multiplexing said signal beams, said receiver including receiving means for receiving said multiplexed optical beam by using a local optical beam to produce an information carrying intermediate frequency signal and for receiving said multiplexed signal beam by using said local optical beam to produce a data carrying intermediate frequency signal, said receiver comprising detecting means connected to said receiving means for detecting one of said channel discrimination signals in said information carrying intermediate frequency signal in correspondence to one of said channels that should be received wherein said detecting means comprises:

filter means connected to said receiving means and being operable at a selected frequency selected from said different frequencies in correspondence to said one of the channels to detect said one of the channel discrimination signals in said information carrying intermediate frequency signal, said one of the channel discrimination signals having said selected frequency and a channel detection signal level;

a signal producing circuit connected to said filter means for producing said receiver control signal be detecting said channel detection signal level and for making said receiver control signal represent said first and said second control values while said channel detection signal level is not detected and instantaneously when said channel selection signal level is detected.

7. In a wavelength division multiplexed coherent optical communication system including a transmitter and a receiver, said transmitter for wavelength division multiplexing signal beams of plurality of channels into a multiplexed signal beam, and frequency modulating optical beams of a plurality of channels into frequency modulated beams by channel discrimination signal having different frequencies in correspondence to said channel before wavelength division multiplexing said signal beams, said receiver including receiving means for receiving said multiplexed optical beam by using a local optical beam to produce an information carrying intermediate frequency signal and for receiving said multiplexed signal beam by using said local optical beam to produce a data carrying intermediate frequency signal, said receiver comprising detecting means connected to said receiving means for detecting one of said channel discrimination signals in said information carrying intermediate frequency signal in correspondence to one of said channels that should be received wherein:

said detecting means is operable at a selected frequency selected from said different frequencies in correspondence to said one of the channels to detect said one of the channel discrimination signals that has said selected frequency;

said receiver further comprising upward going signal beam generating means connected to said detecting means for generating an upward going signal beam in accordance with one of the channel discrimination signals.

* * * * *

UNITED STATES PATENT AND TRADEMARK OFFICE
CERTIFICATE OF CORRECTION

PATENT NO. : 5,191,457
DATED : March 2, 1993
INVENTOR(S) : Shuntaro YAMAZAKI It is certified that error appears in the above-identified patent and that said Letters Patent is hereby corrected as shown below:

Col. 13, line 14, delete "26" and insert --25--.

Col. 15, line 61, delete "bema" and insert --beam--.

Signed and Sealed this

Twenty-fourth Day of January, 1995

Attest:

BRUCE LEHMAN

Attesting Officer     Commissioner of Patents and Trademarks